April 5, 1949.  A. W. GARDES  2,466,409
ELECTRIC ROASTER
Filed Feb. 16, 1944  2 Sheets-Sheet 1

INVENTOR.
Alfred W. Gardes.
BY
Edwin J. Balluff
ATTORNEY.

Patented Apr. 5, 1949

2,466,409

UNITED STATES PATENT OFFICE 2,466,409

ELECTRIC ROASTER

Alfred W. Gardes, Detroit, Mich., assignor to McCord Corporation, a corporation of Maine Application February 16, 1944, Serial No. 522,671

1 Claim. (Cl. 219—35)

This invention relates to roasters and has particular reference to a new and improved type of electric roaster construction.

The invention has particular reference to a novel and efficient heating system for an electric roaster or the like.

Principal objects of the invention are to provide:

A new and improved form of electric roaster; and

An efficient heating system for electric roasters and the like.

Other objects and advantages of the invention will be apparent from a consideration of the following specification, taken in conjunction with the accompanying drawings, of which there are two sheets and wherein.

Figure 1:
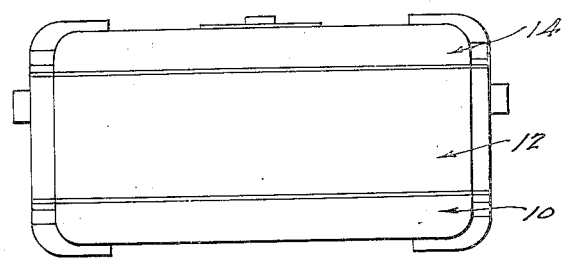
Fig. 1 is a side elevational view of an electric roaster embodying the invention.
Figure 2:
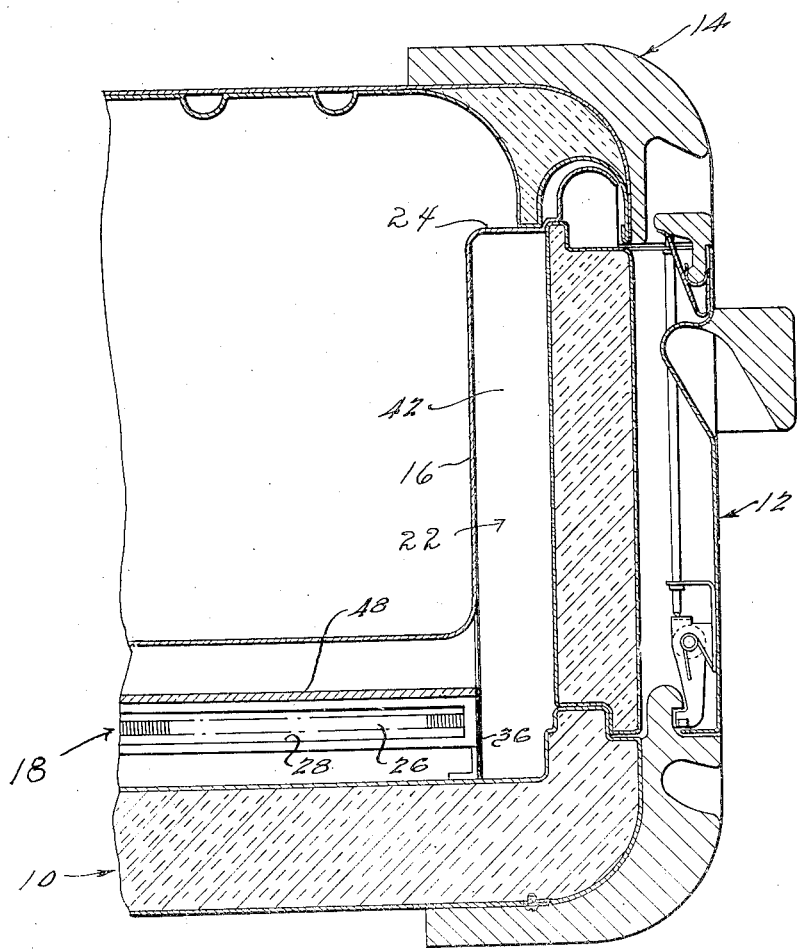
Fig. 2 is an enlarged fragmentary vertical sectional view through a part of the roaster.
Figure 3:
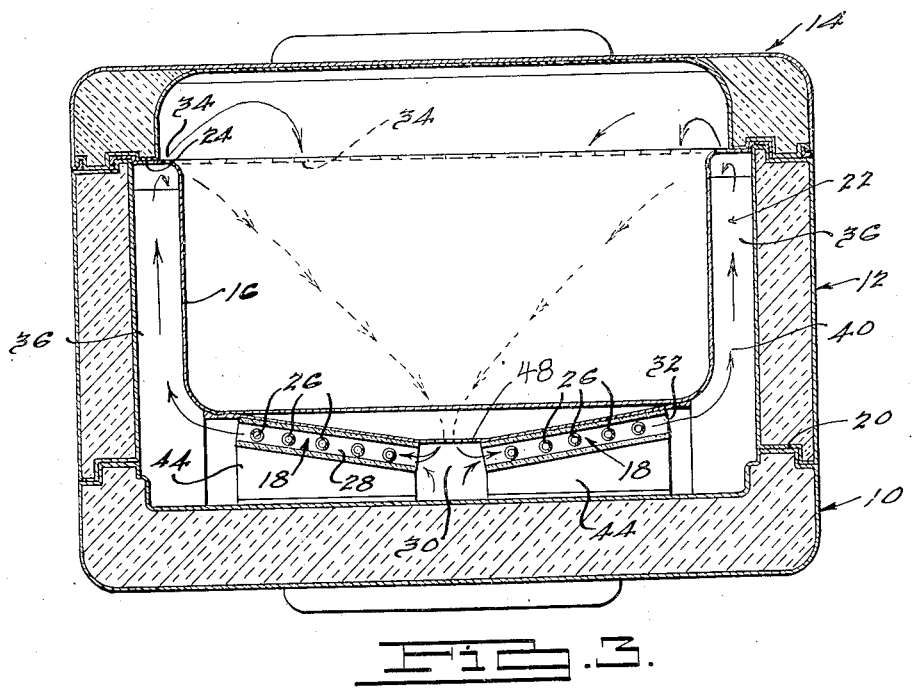
Fig. 3 is a vertical cross sectional view through the roaster.
Figure 4:
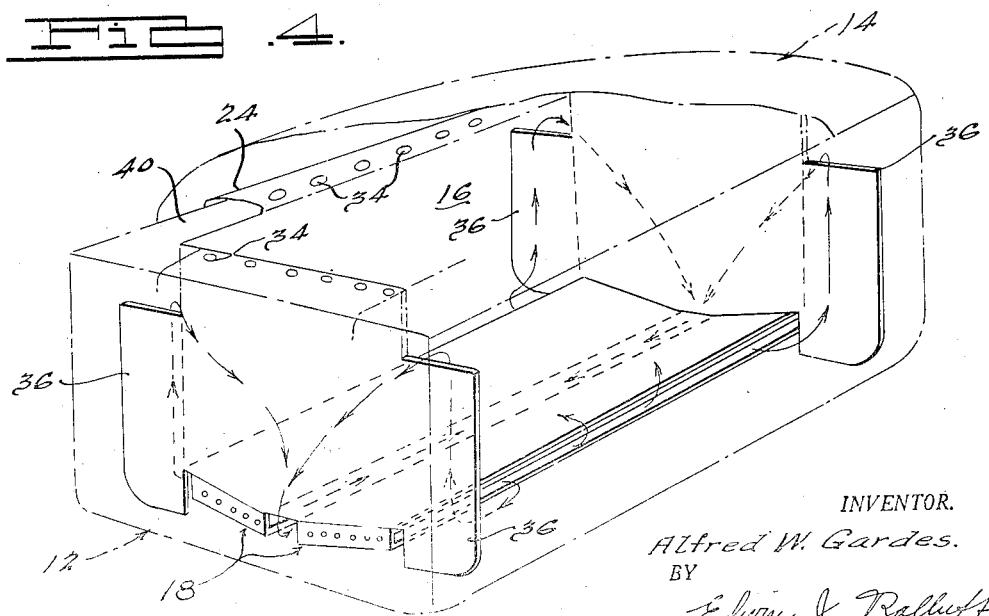
Fig. 4 is a schematic view in perspective illustrating the heating and air circulating system.

The electric roaster as illustrated includes a base 10, a shell 12, and a cover 14. As illustrated in Figs. 2 and 3, the base 10 may be provided by a generally flat insulated wall which is adapted to be set up on a suitable support and which in turn is adapted to support the other elements of the roaster which include, in addition to those previously mentioned, a pan 16 and electric resistance heating elements 18. The edge of the base 10 may be upturned and formed to provide a marginal seat 20 for a complementarily formed seat provided on the underside of the shell 12. The shell 12 is hollow and comprises an insulated wall which is adapted to cooperate with the base 10 to provide a well 22 in which the pan 16 is arranged. The pan 16 at its upper edge is provided with a laterally extending marginal flange 24 which is adapted to seat on the upper rim of the shell 12 for removably supporting the pan 16 in the well 22 and so that the sides and ends of the pan 16 are in spaced relation with the inside walls of the shell 12. The cover 14 is suitably formed to seat removably upon the upper rim of the shell 12 or upon the marginal flange 24 of the pan 16.

The particular construction of electric roaster illustrated is quite similar to that disclosed in the application of George P. Anderson, Serial No. 510,845, filed November 17, 1943, for "Electric cooker," wherein are claimed certain features disclosed but claimed herein, such for example as the locking means by which the shell 12 is releasably locked to the base 10. The present application is not particularly concerned with the specific construction of the outer walls of the roaster or the particular way in which the several parts thereof may be arranged, but has reference to a new and improved heating and air circulating system for electric roasters and the like.

The heating means comprises a pair of electric resistance heating elements 18, each of which may comprise a plurality of resistance coils 26 extending lengthwise of the roaster and arranged in a sloping passage or chimney 28. Each of the chimneys 28 may be defined by spaced insulated walls which are open at the bottom and top thereof, the end walls which define said chimneys forming supports for the coils 26. The lower ends of the passageways or chimneys 28 are arranged in spaced relation and opposite to each other, the space therebetween forming a channel 30 which is open at the ends thereof. The heating elements 18 extend along the entire length of the pan 16. The upper ends 32 of the chimneys or passageways 28 terminate adjacent the sides of the pan 16 so that when the coils 26 are energized a thermal circulation of air will be effected through the passageways or chimneys 28, the heated air discharged from the upper ends 32 thereof passing laterally and then upwardly through the passages 40 at the sides of the pan 16 for transferring heat thereto. The flange 24 of the pan may, as illustrated, be provided with a plurality of holes 34 extending around the periphery thereof, thereby permitting at least some of the upwardly flowing currents of heated air to pass into the space between the pan 16 and the cover 14, thereby to effect transfer of heat with the food contained in the pan 16.

The chimneys 28 are supplied with air to be heated from the channel 30 which, as previously indicated, communicates at its ends with the passages or spaces 42 between the end walls of the pan 16 and the inside end walls of the shell 12. Such spaces 42 between the end walls of the pan 16 and the inside end walls of the shell 12 are separated from the remaining passages or spaces 40 within the well 22 (at the sides of the pan 16) by baffles 36 which may be carried by the pan 16. These baffles 36 may be arranged in the same plane as the end walls of the pan 16 and project beyond the side walls of the pan 16 so as to separate the passages 42 at the ends of the pan from the passages 40 on the sides of the pan 16. Upper parts of these baffles 36 may, however, be notched or relieved so as to provide communication between the spaces 40 and the spaces 42. Thus some of the air rising in these spaces 40 may pass over the upper ends of the baffle 36 into the spaces 42, while other parts of such air will pass upwardly through the openings 34 in the rim of the pan and after circulating through the space between the pan 16 and the cover 14 will pass downwardly through the holes 34 at the ends of the pan 16 and into the spaces 42. The spaces 42 at the bottom thereof communicate with the ends of the channel 30 for supplying air to the lower ends of the chimneys 28 to be reheated thereby. The lower ends of the baffles 36 close the ends of the spaces 40 below the pan 16, while the legs or brackets 44 of the heating elements close the space below the chimneys 28 at the ends thereof.

In some cases the openings 34 in the pan may be omitted, in which event the air from the spaces 40 would pass to the spaces 42 through the communication afforded above the baffles 36.

In order to minimize the heat conduction from the coils 26 to the bottom of the pan, a panel or wall 48 may overlie the heating elements 18 so that the side and end walls of the pan 16 will be heated by the recirculating air substantially as fast as the bottom wall of the pan 16 will be heated by conduction directly from the heating elements 18. It is to be understood, of course, that the air which passes through the chimneys 28 passes in a closed path upwardly along the sides of the pan, thence downwardly over the ends thereof, and back to be reheated. This is so whether or not the openings 34 are provided.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claim.

I claim:

In an electric roaster having side and bottom walls defining a well with a cover enclosing said well, a pan arranged in said well below said cover and in such a manner that the outer vertical walls of said pan are spaced from said walls defining said well and so that the space above said pan and below said cover is in communication with the space in said well externally of said pan, electric heating means having heat dissipating portions thereof arranged below said pan and exposed to heat air in said well to establish thermal currents of air therein, and baffles in said well for directing said currents of air in heat exchange relationship with the outer vertical walls of said pan for heating the same and through said space below said cover and above said pan and thence back to said heat dissipating portion of said electric heating means to be reheated thereby, said electric heating means being arranged to direct a current of heated air upwardly along each side of said pan, said baffles being arranged to direct the return of air to said heating means downwardly along each end of said pin and in heat exchange relationship therewith, said heat dissipating portions having an air channel therebetween which extends between the return air spaces at the ends of said pan.

ALFRED W. GARDES.

REFERENCES CITED

The following references are of record in the file of this patent:

UNITED STATES PATENTS

| Number | Name | Date |
|---|---|---|
| 993,178 | Lamont | May 23, 1911 |
| 999,618 | Luppold et al. | Aug. 1, 1911 |
| 2,025,515 | Jones | Dec. 24, 1935 |
| 2,142,381 | Sickinger | Jan. 3, 1939 |
| 2,187,888 | Nachumsohn | Jan. 23, 1940 |
| 2,266,901 | Parsons | Dec. 23, 1941 |